United States Patent
Xu et al.

(10) Patent No.: US 9,360,690 B2
(45) Date of Patent: Jun. 7, 2016

(54) LIQUID CRYSTAL ALIGNMENT CONTROL SYSTEM AND METHOD

(71) Applicant: SHENZHEN CHINA STAR OPTOELECTRONICS TECHNOLOGY CO., LTD., Shenzhen, Guangdong (CN)

(72) Inventors: Zhengxing Xu, Guangdong (CN); Shengpeng Mo, Guangdong (CN)

( * ) Notice: Subject to any disclaimer, the term of this patent is extended or adjusted under 35 U.S.C. 154(b) by 0 days.

(21) Appl. No.: 14/111,779

(22) PCT Filed: Jul. 4, 2013

(86) PCT No.: PCT/CN2013/078776
§ 371 (c)(1),
(2) Date: Oct. 15, 2013

(87) PCT Pub. No.: WO2014/205875
PCT Pub. Date: Dec. 31, 2014

(65) Prior Publication Data
US 2016/0116767 A1    Apr. 28, 2016

(30) Foreign Application Priority Data
Jun. 28, 2013 (CN) .......................... 2013 1 0270012

(51) Int. Cl.
*G02F 1/13*     (2006.01)
*G02F 1/1337*   (2006.01)

(52) U.S. Cl.
CPC ............ *G02F 1/1303* (2013.01); *G02F 1/1309* (2013.01); *G02F 1/133788* (2013.01)

(58) Field of Classification Search
CPC   G02F 1/1303; G02F 1/1309; G02F 1/133788
See application file for complete search history.

(56) References Cited

U.S. PATENT DOCUMENTS

| | | | | |
|---|---|---|---|---|
| 2009/0167341 A1* | 7/2009 | Liu | ........................ | G02F 1/1303 324/760.01 |
| 2010/0066961 A1* | 3/2010 | Matsui | .............. | G02F 1/133723 349/129 |
| 2013/0033672 A1* | 2/2013 | Li | ............................ | B26D 1/10 349/187 |
| 2013/0088679 A1* | 4/2013 | Lu | ........................... | G09G 3/006 349/139 |
| 2013/0340589 A1* | 12/2013 | Pan | .......................... | B26D 3/00 83/861 |
| 2014/0232965 A1* | 8/2014 | Xu | ........................ | G02F 1/1309 349/43 |

* cited by examiner

*Primary Examiner* — Donald Raleigh
*Assistant Examiner* — Kevin Quarterman

(57) ABSTRACT

A liquid crystal alignment control method includes: obtaining a production substrate information of the liquid crystal substrate, wherein the production substrate information comprises a test information of each panel of the liquid crystal substrate; determining the panels of the liquid crystal substrate are qualified or unqualified according to the test information of the liquid crystal substrate; controlling a driving power source to provide voltage to the qualified panels of the liquid crystal substrate by a first mode; and controlling the driving power source to provide voltage to the unqualified panel of the liquid crystal substrate by a second mode.

12 Claims, 2 Drawing Sheets

LIQUID CRYSTAL ALIGNMENT CONTROL SYSTEM AND METHOD

TECHNICAL FIELD OF THE INVENTION

The present invention relates to control systems, and more particularly, to a control system for aligning liquid crystals and a method thereof.

BACKGROUND OF THE INVENTION

Nowadays, liquid crystal display (LCD) panels are broadly used in LCD devices and LCD televisions. A usual processing of producing the LCD panel is by using an integrated substrate to cut to a number of LCD panels. For the integrated substrate, it is need to be aligned using a HVA photo-alignment method, namely, when the substrate is applied voltage, through applying ultraviolet (UV) light to irradiate the substrate to cause monomers of the substrate to reflect, thus achieving the alignment. Nowadays, the HVA photo-alignment method is broadly used in thin film transistor (TFT) LCD industry. In order to guarantee the liquid crystals to form a predetermined angle under the irradiation of the UV light, an ultraviolet photo-alignment device (HVA device) is provided to apply voltage to voltage input ports of the substrate via a driving power source to cause the liquid crystals to rotate to the predetermined angle. Usually, the substrate includes an odd gate signal input port, an even gate signal input port, a red signal input port, a green signal input port, a blue signal input port, a color film common electrode signal input port, and an array common electrode signal input port. Usually, the UVA device applies the voltage to the substrate via the driving power source is by respectively applying the voltage to the signal input ports independent, and the voltage applied to the signal input ports are different. For example, the odd gate signal input port and the even gate signal input port are applied to the same voltage, and the red signal input port, the green signal input port, and the blue signal input port are applied to the same voltage, such as 0 volt, the color film common electrode signal input port and the array common electrode signal input port are applied to the same voltage, such as 5 volts.

However, when there is a LCD panel of the substrate is unqualified, it is easy to cause the color film common electrode signal input port is short-circuited with the odd gate signal input port, the even gate signal input port, the red signal input port, the green signal input port, and the blue signal input port. Thus causing a voltage of a color film common electrode lead wire connected to the color film common electrode signal input port becomes abnormally, and then causes the HVA photo-alignment is failed. The substrate is scrapped because it cannot be aligned.

SUMMARY OF THE INVENTION

The present invention provides a liquid crystal alignment control system and method, which capable of ensuring the qualified panels of the substrate to be aligned even though the substrate includes a unqualified panel.

A liquid crystal alignment control system, comprising a ultraviolet photo-alignment device and a driving power source, wherein the liquid crystal alignment control system is configured to control an alignment of liquid crystals of a liquid crystal substrate; the liquid crystal substrate comprises a number of panels, each panel comprises an odd gate signal input port, an even gate signal input port, a red signal input port, a green signal input port, a blue signal input port, and a color film common electrode signal input port; the driving power source is configured to provide corresponding power voltages to these signal input ports of the panels; the ultraviolet photo-alignment device is configured to apply ultraviolet light to irradiate the panels to align the liquid crystals when the driving power source provides the power voltage to the signal input ports of the panels; wherein, the liquid crystal alignment control system further comprises a control device; the ultraviolet photo-alignment device is also configured to obtain a production substrate information of the liquid crystal substrate and transmit the production substrate information to the control device, the production substrate information comprises a test information of each panel of the liquid crystal substrate; the control device is configured to determine the panels of the liquid crystal substrate are qualified or unqualified according to the test information, and control the driving power source to provide voltage to the qualified panel of the liquid crystal substrate by a first mode and controls the driving power source to provide voltage to the unqualified panel of the liquid crystal substrate by a second mode, according to whether the panel of the liquid crystal substrate is qualified or unqualified.

Therein, the control device controls the driving power source to provide the voltage to the qualified panel of the liquid crystal substrate by the first mode is: controls the driving power source to provide a normal voltage to each signal input port of the qualified panel according to a normal production parameter.

Therein, the control device controls the driving power source to provide the voltage to the unqualified panel of the liquid crystal substrate by the second mode is: controls the driving power source to provide the normal voltage to the color film common electrode signal input port of the unqualified panel, and controls the driving power source to provide the same voltage as the color film common electrode signal input port to the odd gate signal input port, the even gate signal input port, the red signal input port, the green signal input port, and the blue signal input port of the unqualified panel.

Therein, the control device is a computer.

Therein, the ultraviolet photo-alignment device obtains the production substrate information of the liquid crystal substrate from a production machine control device.

Therein, the ultraviolet photo-alignment device and the control device are connected to each other via a wire mode, the wire mode comprises one of a universal serial bus line, a fire wire, and a serial port line.

Therein, the ultraviolet photo-alignment device and the control device are connected to each other via a wireless mode, the wireless mode comprises one of WIFI and Bluetooth.

Therein, the driving power source comprises a plurality of voltage output ports, the voltage output ports are respectively connected to the odd gate signal input port, the even gate signal input port, the red signal input port, the green signal input port, the blue signal input port, and the color film common electrode signal input port; the driving power source provides corresponding voltages to these signal input ports of the panel via these voltage output ports.

A liquid crystal alignment control method, configured to control an alignment of liquid crystals of a liquid crystal substrate, the liquid crystal substrate comprises a number of panels, each panel comprises an odd gate signal input port, an even gate signal input port, a red signal input port, a green signal input port, a blue signal input port, and a color film common electrode signal input port; the method comprising: obtaining a production substrate information of the liquid crystal substrate, wherein the production substrate information comprises a test information of each panel of the liquid crystal substrate; determining the panels of the liquid crystal substrate are qualified or unqualified according to the test information of the liquid crystal substrate; controlling a driving power source to provide voltage to the qualified panels of the liquid crystal substrate by a first mode; and controlling the driving power source to provide voltage to the unqualified panel of the liquid crystal substrate by a second mode.

Therein, the step of controlling a driving power source to provide voltage to the qualified panels of the liquid crystal substrate by a first mode comprises: controlling the driving power source to provide normal voltages to each signal input port of the qualified panel according to a normal production parameter.

Therein, the step of controlling the driving power source to provide voltage to the unqualified panel of the liquid crystal substrate by a second mode comprises: controlling the driving power source to provide a normal voltage to the color film common electrode signal input port of the unqualified panel; and controlling the driving power source to provide the same voltage as the color film common electrode signal input port to the odd gate signal input port, the even gate signal input port, the red signal input port, the green signal input port, and the blue signal input port of the unqualified panel.

Therein, the test information of each panel of the liquid crystal substrate comprises information indicating each panel is qualified or unqualified.

The liquid crystal alignment control system and method capable of ensuring the qualified panels of the substrate to be aligned even though the substrate includes unqualified panels.

DETAILED DESCRIPTION OF THE PREFERRED EMBODIMENTS

Figure 1:
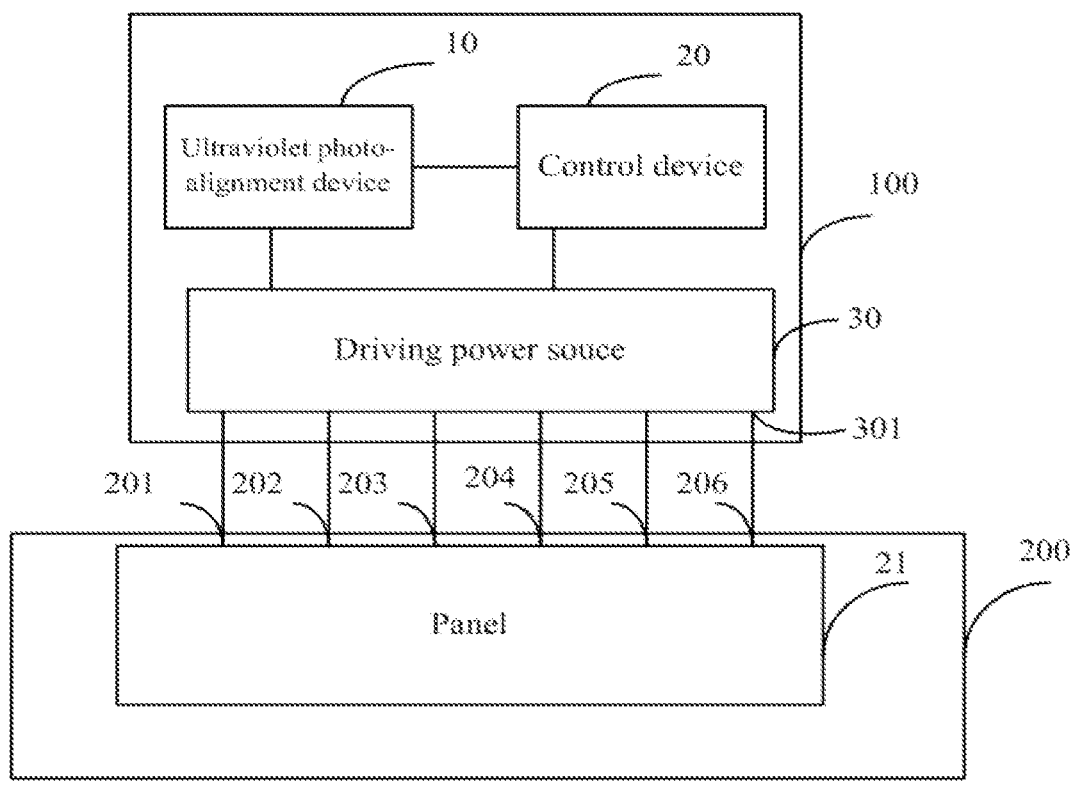
FIG. 1 is a schematic diagram of a liquid crystal alignment control system of an embodiment.

Referring to FIG. 1, a liquid crystal alignment control system 100 is illustrated. The liquid crystal alignment control system 100 includes an ultraviolet photo-alignment device 10, a control device 20, and a driving power source 30. The liquid crystal alignment control system 100 is used to control the alignment of liquid crystals of a liquid crystal substrate 200.

The liquid crystal substrate 200 includes a number of panels 21, each panel 21 includes an odd gate signal input port 201, an even gate signal input port 202, a red signal input port 203, a green signal input port 204, a blue signal input port 205, and a color film common electrode signal input port 206.

The driving power source 30 is used to provide corresponding power voltages to these signal input ports of the panel 21. The ultraviolet photo-alignment device 10 is used to apply ultraviolet (UV) light to irradiate the substrate 200 to align the liquid crystals when the driving power source 30 provides the power voltage to the panel 21.

The ultraviolet photo-alignment device 10 is also used to obtain a production substrate information of the liquid crystal substrate 200 and transmit the production substrate information to the control device 20. The production substrate information includes test information of each panel 21 of the liquid crystal substrate 200. In detail, the ultraviolet photo-alignment device 10 obtains the production substrate information of the liquid crystal substrate 200 from a production machine control device (not shown). The test information includes the information indicating each panel is qualified or unqualified.

The control device 20 determines the panels of the liquid crystal substrate 200 are qualified or unqualified according to the test information.

The control device 20 controls the driving power source 30 to provide voltage to the qualified panel 21 of the liquid crystal substrate 200 by a first mode and controls the driving power source 30 to provide voltage to the unqualified panel 21 of the liquid crystal substrate 200 by a second mode, based on the panel 21 of the liquid crystal substrate 200 is qualified or unqualified. In detail, the control device 20 controls the driving power source 30 to provide the voltage to the qualified panel 21 of the liquid crystal substrate 200 by a first mode is: controls the driving power source 30 to provide normal voltages to each signal input port of the qualified panel 21 according to a normal production parameter. The control device 20 controls the driving power source 30 to provide the voltage to the unqualified panel 21 of the liquid crystal substrate 200 by the second mode is: controls the driving power source 30 to provide a normal voltage to the color film common electrode signal input port 206 of the unqualified panel 21, and controls the driving power source 30 to provide the same voltage as the color film common electrode signal input port 206 to the odd gate signal input port 201, the even gate signal input port 202, the red signal input port 203, the green signal input port 204, and the blue signal input port 205 of the unqualified panel 21. Therefore, because the voltage applied to these signal input ports are all the same as the voltage of the color film common electrode signal input port 206, if there is short circuited, the voltage of the color film common electrode signal input port 206 is also can be normal.

In the embodiment, the control device 20 is a computer.

Therein, the ultraviolet photo-alignment device 10 and the control device 20 are connected to each other via a universal serial bus (USB) line, a fire wire (IEEE 1394), a serial port line, and other wire mode, or via WIFI, Bluetooth, and other wireless mode.

Therein, the driving power source 30 includes a number of voltage output ports 301, the voltage output ports 301 are respectively connected to the odd gate signal input port 201, the even gate signal input port 202, the red signal input port 203, the green signal input port 204, the blue signal input port 205, and the color film common electrode signal input port 206. The driving power source 30 provides corresponding voltages to these signal input ports of the panel 21 via these voltage output ports 301.

Figure 2:
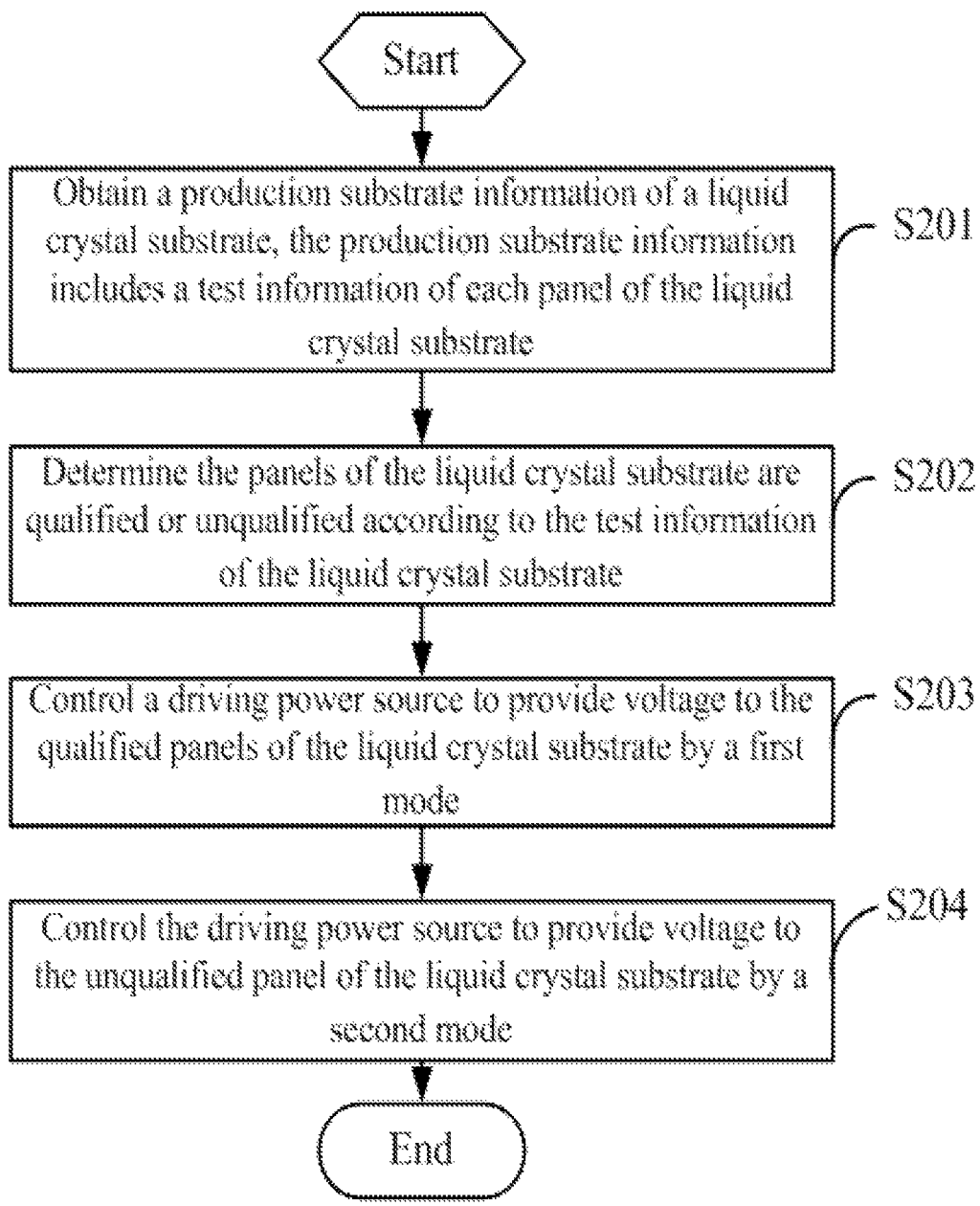
FIG. 2 is a flowchart illustrating a liquid crystal alignment control method of an embodiment.

Referring to FIG. 2, a liquid crystal alignment control method is illustrated. At first, the ultraviolet photo-alignment device 10 obtains the production substrate information of the liquid crystal substrate 200 and transmits the production substrate information to the control device 20, the production substrate information includes test information of each panel 207 of the liquid crystal substrate 200 (S201).

The control device 20 determines the panels 21 of the liquid crystal substrate 200 are qualified or unqualified according to the test information of the liquid crystal substrate 200 (S202).

The control device 20 controls the driving power source 30 to provide voltage to the qualified panels 21 of the liquid crystal substrate 200 by a first mode according to the panels 21 of the liquid crystal substrate 200 are qualified or unqualified (S203). In detail, the control device 20 controls the driving power source 30 to provide the voltage to the qualified panel 21 of the liquid crystal substrate 200 by the first mode is: controls the driving power source 30 to provide normal voltages to each signal input port of the qualified panel 21 according to a normal production parameter.

The control device 20 also controls the driving power source 30 to provide voltage to the unqualified panel 21 of the liquid crystal substrate 200 by a second mode (S204). In detail, the control device 20 controls the driving power source 30 to provide the voltage to the unqualified panel 21 of the liquid crystal substrate 200 by the second mode is: controls the driving power source 30 to provide a normal voltage to the color film common electrode signal input port 206 of the unqualified panel 21, and controls the driving power source 30 to provide the same voltage as the color film common electrode signal input port 206 to the odd gate signal input port 201, the even gate signal input port 202, the red signal input port 203, the green signal input port 204, and the blue signal input port 205 of the unqualified panel 21.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A liquid crystal alignment control system, comprising an ultraviolet photo-alignment device and a driving power source, wherein the liquid crystal alignment control system is configured to control an alignment of liquid crystals of a liquid crystal substrate; the liquid crystal substrate comprises a number of panels, each panel comprises an odd gate signal input port, an even gate signal input port, a red signal input port, a green signal input port, a blue signal input port, and a color film common electrode signal input port; the driving power source is configured to provide corresponding power voltages to these signal input ports of the panels; the ultraviolet photo-alignment device is configured to apply ultraviolet light to irradiate the panels to align the liquid crystals when the driving power source provides the power voltage to the signal input ports of the panels; wherein, the liquid crystal alignment control system further comprises a control device; the ultraviolet photo-alignment device is also configured to obtain a production substrate information of the liquid crystal substrate and transmit the production substrate information to the control device, the production substrate information comprises a test information of each panel of the liquid crystal substrate; the control device is configured to determine the panels of the liquid crystal substrate are qualified or unqualified according to the test information, and control the driving power source to provide voltage to the qualified panel of the liquid crystal substrate by a first mode and controls the driving power source to provide voltage to the unqualified panel of the liquid crystal substrate by a second mode, based on the panel of the liquid crystal substrate is qualified or unqualified.

2. The liquid crystal alignment control system of claim 1, wherein the control device controls the driving power source to provide the voltage to the qualified panel of the liquid crystal substrate by the first mode is: controls the driving power source to provide a normal voltage to each signal input port of the qualified panel according to a normal production parameter.

3. The liquid crystal alignment control system of claim 2, wherein the control device controls the driving power source to provide voltage to the unqualified panel of the liquid crystal substrate by the second mode is: controls the driving power source to provide the normal voltage to the color film common electrode signal input port of the unqualified panel, and controls the driving power source to provide the same voltage as the color film common electrode signal input port to the odd gate signal input port, the even gate signal input port, the red signal input port, the green signal input port, and the blue signal input port of the unqualified panel.

4. The liquid crystal alignment control system of claim 3, wherein control device is a computer.

5. The liquid crystal alignment control system of claim 3, wherein the ultraviolet photo-alignment device obtains the production substrate information of the liquid crystal substrate from a production machine control device.

6. The liquid crystal alignment control system of claim 3, wherein the ultraviolet photo-alignment device and the control device are connected to each other via a wire mode, the wire mode comprises one of a universal serial bus line, a fire wire, and a serial port line.

7. The liquid crystal alignment control system of claim 3, wherein the ultraviolet photo-alignment device and the control device are connected to each other via a wireless mode, the wireless mode comprises one of WIFI and Bluetooth.

8. The liquid crystal alignment control system of claim 3, wherein the driving power source comprises a plurality of voltage output ports, the voltage output ports are respectively connected to the odd gate signal input port, the even gate signal input port, the red signal input port, the green signal input port, the blue signal input port, and the color film common electrode signal input port; the driving power source provides corresponding voltages to these signal input ports of the panel via these voltage output ports.

9. A liquid crystal alignment control method, configured to control an alignment of liquid crystals of a liquid crystal substrate, the liquid crystal substrate comprising a number of panels, each panel comprising an odd gate signal input port, an even gate signal input port, a red signal input port, a green signal input port, a blue signal input port, and a color film common electrode signal input port; the method comprising:

obtaining a production substrate information of the liquid crystal substrate, wherein the production substrate information comprises a test information of each panel of the liquid crystal substrate;

determining the panels of the liquid crystal substrate are qualified or unqualified according to the test information of the liquid crystal substrate;

controlling a driving power source to provide voltage to the qualified panels of the liquid crystal substrate by a first mode; and controlling the driving power source to provide voltage to the unqualified panel of the liquid crystal substrate by a second mode.

10. The method of claim 9, wherein the step of controlling a driving power source to provide voltage to the qualified panels of the liquid crystal substrate by a first mode comprises: controlling the driving power source to provide normal voltages to each signal input port of the qualified panel according to a normal production parameter.

11. The method of claim 10, wherein the step of controlling the driving power source to provide voltage to the unqualified panel of the liquid crystal substrate by a second mode comprises:

controlling the driving power source to provide a normal voltage to the color film common electrode signal input port of the unqualified panel; and controlling the driving power source to provide the same voltage as the color film common electrode signal input port to the odd gate signal input port, the even gate signal input port, the red signal input port, the green signal input port, and the blue signal input port of the unqualified panel.

12. The method of claim 11, wherein the test information of each panel of the liquid crystal substrate comprises information indicating each panel is qualified or unqualified.

* * * * *